(No Model.)  2 Sheets—Sheet 1.

J. F. JENSEN.
Apparatus for Steaming Grain.

No. 238,692. Patented March 8, 1881.

Witnesses:—

Inventor:—
Johann F. Jensen
by his Attorneys
Brown & Brown

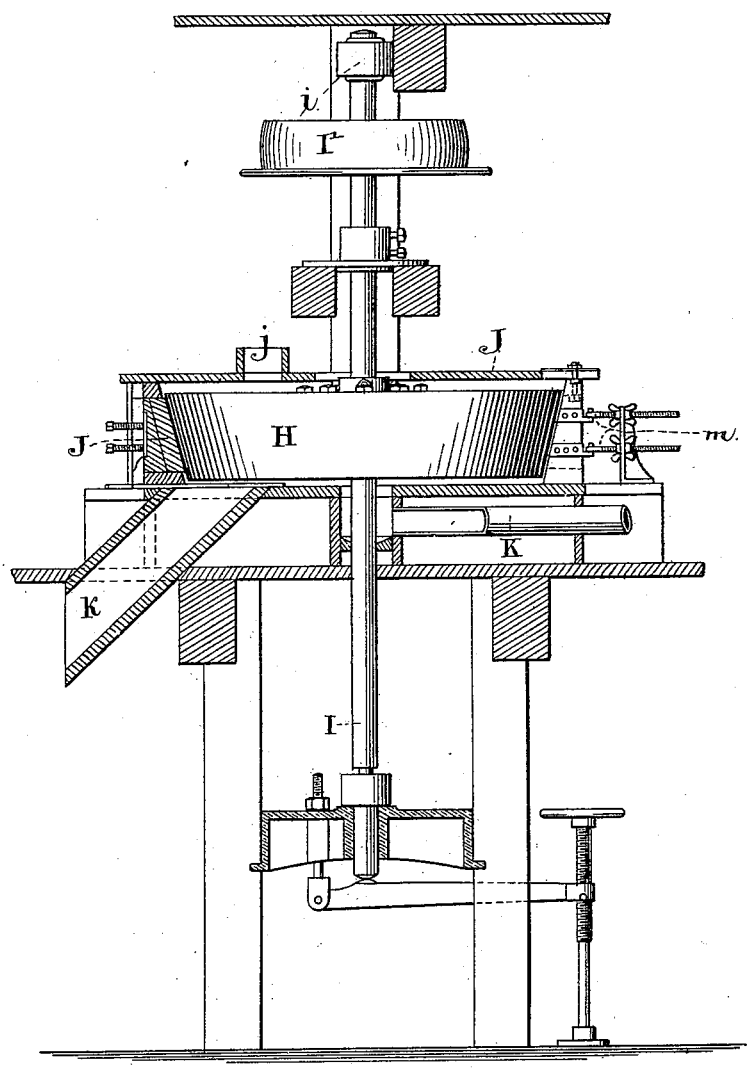

UNITED STATES PATENT OFFICE.

JOHANN F. JENSEN, OF FLENSBURG, GERMANY.

APPARATUS FOR STEAMING GRAIN.

SPECIFICATION forming part of Letters Patent No. 238,692, dated March 8, 1881.

Application filed August 11, 1880. (No model.) Patented in Germany August 1, 1879, in Great Britain March 1, 1880, in France March 13, 1880, and in Belgium March 22, 1880.

*To all whom it may concern:*

Be it known that I, JOHANN FRIEDRICH JENSEN, of Flensburg, in the Empire of Germany, have invented certain new and useful Improvements in Apparatus for Steaming Grain Preparatory to Hulling or Decorticating it, of which the following is a specification.

My invention relates to apparatus for steaming wheat or other grain preparatory to removing the hull or shell thereof, so that the quality of the flour produced from such wheat or grain may be improved.

The invention consists in certain novel features in the construction of mechanism used in connection with a chamber or cylinder through which steam is passed for throwing the wheat or other grain outward by centrifugal force and returning it to the center of said chamber or cylinder, to be again thrown outward, whereby the grain is greatly retarded in its progress through the cylinder from top to bottom, and therefore kept in contact with the steam for a longer period.

Figure 1:
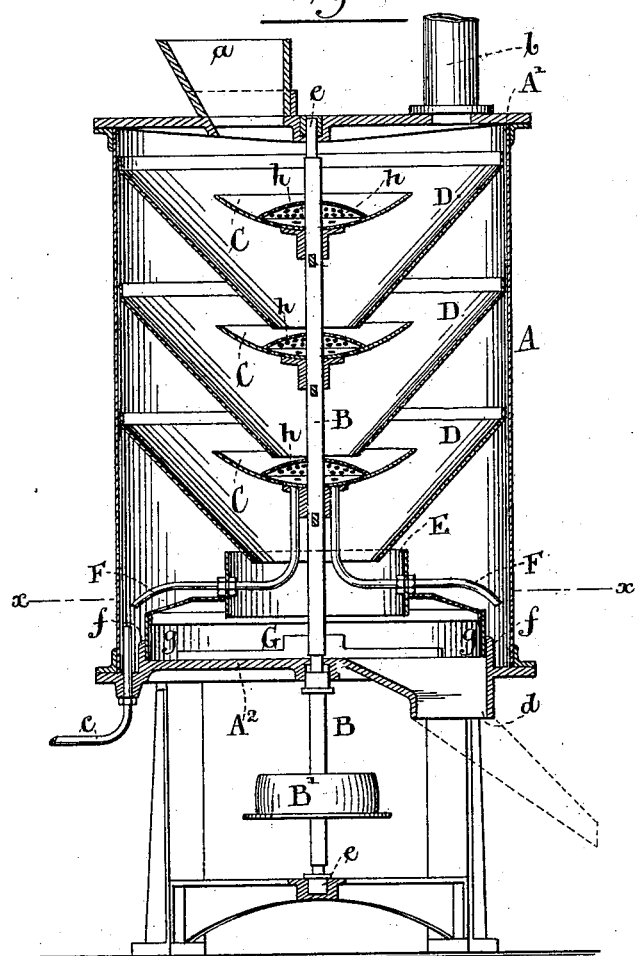
Figure 2:
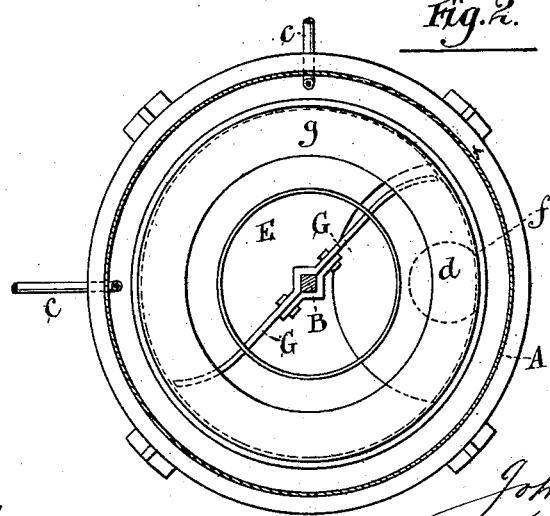

In the accompanying drawings, Figure 1 represents a central vertical section of a steaming apparatus embodying my invention. Fig. 2 represents a horizontal section thereof upon the dotted line $x\,x$, Fig. 1; and Fig. 3 represents a central vertical section of a grinding-mill for removing the hull or shell after steaming the grain.

Similar letters of reference designate corresponding parts in all the figures.

Referring first to the steaming apparatus, A designates an upright cylinder, which may be made of sheet-iron, and is closed at top and bottom by a cover, A', and a bottom plate, A². In the cover A' is a hopper, $a$, for the introduction of corn, and an exhaust-pipe, $b$, for the escape of steam, and in the bottom A² is an inlet-pipe, $c$, for steam, and an outlet-spout, $d$, for the discharge of grain.

Arranged concentrically within the cylinder is a central shaft, B, supported in suitable bearings, $e\,e$, at the upper and lower ends, and receiving motion by a belt over a pulley, B', or by other means. Upon this shaft are secured cup-shaped disks or flanges C, (here shown as three in number, though more or less might be used,) and at the side of and below each disk or flange is a hopper or funnel, D, projecting inward and downward from the inner wall of the cylinder A, as clearly shown.

At the lower end of the cylinder is an upwardly-projecting rim, $f$, within which is the discharge-outlet for the grain, and upon the outside of which is the inlet-pipe, $c$, for steam. To the shaft B is attached, by the chute or funnel E, a disk or cover, $g$, which fits snugly within this rim and prevents the steam from escaping through the discharge-outlet, $d$, for grain.

E designates a cylindrical chute or funnel, receiving within its upper end the lower end of the lowest of the hoppers D, and entering the disk or cover $g$, thus providing for the escape of the grain from the lowest funnel or hopper to the discharge-outlet. The chute or funnel is supported upon pipes F, which extend from the outer circumference of the cylinder inward and upward to the lowest cup-shaped disk or flange C, and which conduct steam thereto. In each of the cup-shaped disks or flanges is a convex perforated distributing-plate, $h$, and in the disks or flanges C, below these perforated plates, are apertures for the passage of steam.

The operation of my machine is as follows: Steam is first let on by the inlet-pipe $c$, and, as it has a tendency to rise, passes freely upward through the mouth of the lowest hopper or funnel D and through the pipes F, thence upward around the cup-shaped disks C and through the funnels or hoppers D, one after another, and also through the perforated distributers $h$, until it reaches the exhaust-pipe $b$, whence it is discharged. The shaft B is then rotated, and the grain introduced through the hopper $a$ falls upon the upper disk or flange, C, in contact with the steam passing through the perforated distributer $h$, and from whence it is thrown by centrifugal force outward, and thence is guided by the hopper or funnel D into the next of the disks or flanges C against the upward current of steam. This operation is repeated until the grain has passed all the cup-shaped disks, after which it falls to the bottom of the cylinder, and is thrown out the discharge-outlet by a rotary scraper, G, fixed upon the shaft B.

It will be understood that the object of throwing the grain outward by centrifugal force and then bringing it into the center is to hold it for a longer time in contact with the steam, and thus effect the more complete separation of the hull or shell from the gluten upon the kernel. The same result might be effected by moving the grain transversely from side to side of a steam-chamber as it gradually travels toward the bottom thereof.

Turning now to the mechanism for rubbing or scouring, H designates a millstone fixed to a rotary shaft, I, provided with a pulley, I', and mounted in suitable bearings, i.

J designates the case of the stone, provided with an inlet-opening, j, at the top for the grain, and an outlet-opening or discharge-port, k, at the bottom. The stone H is tapered or inclined downward, and the inner circumference of the casing is covered with wire-cloth, and may be adjusted toward or from the stone by adjusting-screws m.

K designates a pipe communicating with the casing, to which an exhaust-fan may be connected.

The grain entering through the inlet-opening j is thrown outward by centrifugal force generated by the turning of the stone, and passing downward between the stone and the wire-cloth facing of the casing, the hull or shell which has been loosened from the gluten by steaming is rubbed or cracked off. By the action of the exhaust-fan the hulls or shells are drawn off through the pipe K, while the hulled or decorticated grain passes through the outlet or discharge opening k, and is ready to be reduced to flour.

What I claim as my invention, and desire to secure by Letters Patent, is—

1. The combination, in an apparatus for steaming grain, of an upright chamber or cylinder, an upright rotary shaft arranged therein, two or more cup-shaped disks or flanges fixed upon said shaft, one above another, hoppers arranged opposite said disks or flanges, and projecting from the inner circumference of said chamber or cylinder inwardly and downwardly, for delivering grain from each disk or flange to the one next below it, and inlet and outlet pipes for admitting steam to and exhausting it from said chamber or cylinder, substantially as and for the purpose specified.

2. The combination of the cylinder A, the rotary shaft B, the outlet and inlet pipes, b and c, for steam, the cup-shaped disks or flanges C, provided with perforated distributing-plates h, and the hoppers D, all substantially as specified.

3. The combination of the cylinder, provided with inlet and outlet pipes, c b, for steam, and inlet and outlet openings, a d, for grain, the rotary shaft B, the cup-shaped disks or flanges C, provided with perforated distributing-plates h, the hoppers D, and the rotary scraper G, all substantially as specified.

JOHANN FRIEDRICH JENSEN.

Witnesses:
A. SCHAPER,
F. ENGEL.